Inventor
Alvin J. Musselman

Attorney

Patented July 18, 1933

1,918,553

UNITED STATES PATENT OFFICE

ALVIN J. MUSSELMAN, OF AKRON, OHIO, ASSIGNOR TO THE GOODYEAR TIRE & RUBBER COMPANY, OF AKRON, OHIO, A CORPORATION OF OHIO

PNEUMATIC TIRE AND METHOD OF MAKING IT

Application filed October 4, 1929. Serial No. 397,389.

This invention relates to pneumatic balloon tires and methods of making them, and it has for its principal object the provision of a tire of such relatively small inner diameter that it can be mounted upon a hub barrel of a wheel without employing a wheel disc or spokes.

Another object of the invention is to provide an arrangement of elements particularly adapted to be employed in constructing tires having the characteristics designated above.

Another object of the invention is to provide a method of building cord or fabric tires in such manner as to maintain the cord or fabric uniformly distributed without material distortion thereof at the beads or other portions of the tire.

Heretofore, pneumatic tires have been constructed by applying bands of fabric material circumferentially about toroidal cores or cylindrical drums. It is to be understood that the term "fabric" in this specification is intended to include straight or cross-woven rubberized cord tire building material. In building tires by these methods, the fabric is crowded about the bead of the tire upon the toroidal core or a portion of the tire is bulged out in such manner as to separate the cords at the thread when shaping tires that are built upon cylindrical drums. Although both of these methods have been employed with considerable success, it has been impossible to distribute the cords of fabric without considerable distortion thereof at the locations mentioned.

A pneumatic tire built according to this invention is composed of uniformly distributed cord elements which are applied radially of the tire and obviate distortion thereof at either the beads or the tread portions. Although such tires are particularly adapted to be employed as parts of aircraft landing gear, they may be applied to various other types of vehicles.

For a better understanding of the invention, reference may now be had to the accompanying drawing, forming a part of the specification, of which;

Figure 1:
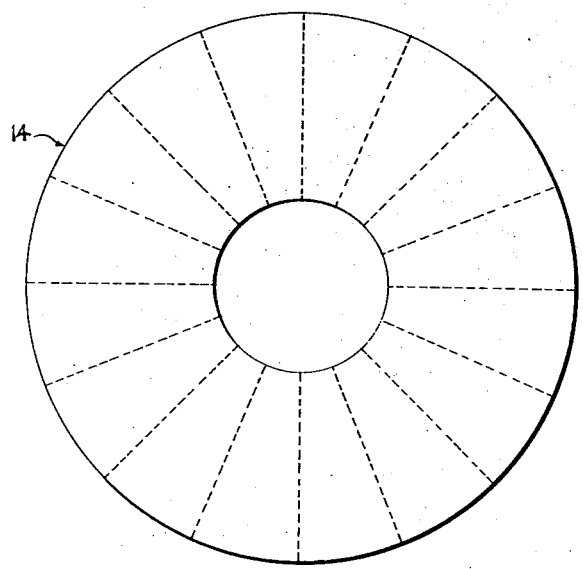
Figure 1 is a side elevational view of a tire constructed according to the invention.
Figure 2:
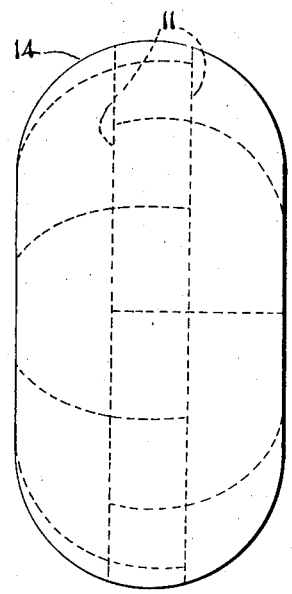
Figure 2 is an elevational view taken at right angles to that of Figure 1.
Figure 3:
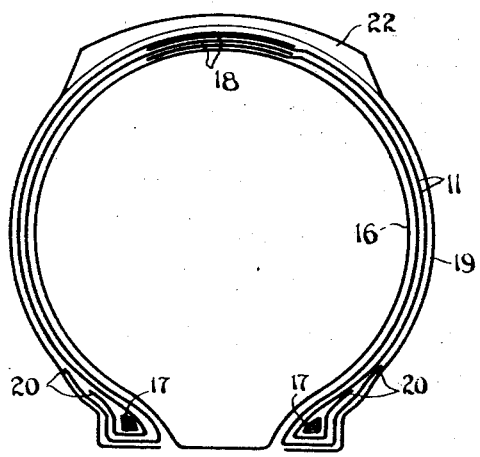
Figure 3 is a diagrammatical cross-sectional view taken substantially along the line III—III of Figure 1.

In practicing the invention, a sheet of tire building fabric 10, preferably cut on a bias, is divided into a plurality of strips or elements 11 of trapezoidal shape, each of which has shorter and longer parallel edges 12 and 13, respectively. These elements which are included in a tire 14, are applied to an annulus 16 of substantially tire shape in such manner that the shorter edges 12 are turned or looped about beads 17, and the longer edges 13 are disposed in overlapped relation, as indicated at 18, at the tread portion of the tire. Circumferentially of the tire the strips 11 are arranged in series on each side of the tire with their substantially radially disposed edges disposed in abutting relation, or such edges may be overlapped. Also, the strips 11 on opposite sides of the tire are arranged in staggered relation. Additional elements 19 cut slightly longer than the elements 11 are superposed upon the latter and their inner edges are disposed in stepped relation with the edges of the elements 11 at the sides of the tire, as indicated at 20. All of the strips 11 and 19 are applied in substantially the same manner, and by employing different sizes thereof, as many plies as desired can be built into a tire without materially distorting the fabric of the tire building material. A conventional tread 22 is applied which is either cemented or vulcanized about the tire 14. It is preferred to apply a tread of such dimensions that its edges extend about the bead portions of the tire.

Figure 4:
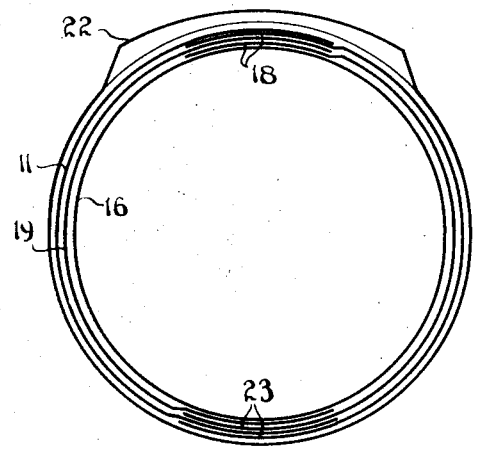
Figure 4 is a diagrammatical cross-sectional view similar to Figure 3, illustrating another form of the invention.
Figure 5:
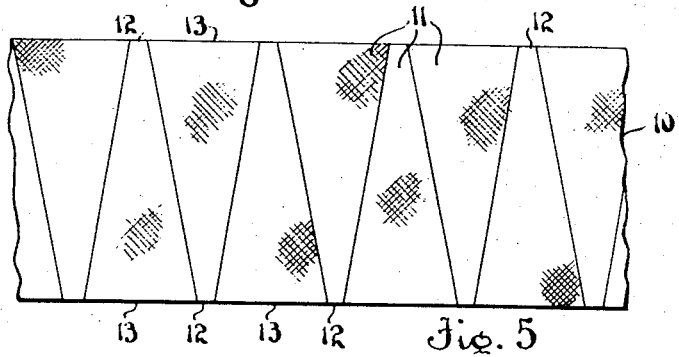
Figure 5 is a plan view of a sheet of cord or fabric tire building material.

In the form of the invention shown by Figure 4, the strips 11 and 19 are not turned or looped about the beads, but are overlapped, as indicated at 23, and the annulus 16 remains and constitutes a part of the finished tire.

From the foregoing description, it will be apparent that the invention provides a tire which can be constructed of a great many plies and of widely differing maximum and minimum circumferential diameters. Although the plies are somewhat concentrated about the bead portions of the tire, the cords are not crowded, and the tread portion of the tire is reinforced without stretching or distorting the tire building materials.

Although I have illustrated only the preferred forms which the invention may assume, and have described those forms in detail, it will be apparent to those skilled in the art that the invention is not so limited but that various modifications may be made therein without departing from the spirit of the invention or from the scope of the appended claims.

What I claim is:

1. A pneumatic tire comprising a plurality of strips of tire building material varying in width from one end to the other thereof, the narrow ends of the strips being disposed adjacent the opposite sides of the inner circumferential portion of the tire, and the wider ends of the strips lying in overlapping staggered relation at the tread portion of the tire.

2. A pneumatic tire comprising a plurality of strips of tire-building material of varying width applied at their small ends to each of the bead portions of the tire, said strips extending in toroidal shaped curves to the tread portion of the tire, the wide ends of the strips lying in overlapping relation about the tread portion of the tire.

3. A pneumatic tire comprising a plurality of trapezoidal strips of bias cut tire building material, the narrower ends of the strips being secured along each of the bead area portions of the tire, the wider ends of the strips being overlapped along the tread portion of the tire, said strips being arranged in staggered relation on opposite sides of the tire, and additional strips of the same character applied upon and in staggered relation to the first mentioned strips.

4. A method of making a tire which comprises severing a sheet of tire building material into a plurality of trapezoidal elements, arranging the elements substantially radially upon both sides of an annulus, and securing the opposite parallel edges of each element adjacent the inner and outer circumferential portions, respectively, of the annulus, with the elements from the opposite sides of the annulus being overlapped at the outer circumference of the annulus.

5. A method of making a tire which comprises severing a sheet of tire building material into a plurality of trapezoidal elements, securing the shorter edges of the elements together at the inner circumferential portion of the annulus, and securing the opposite edges of the elements in overlapping relation about the outer circumferential portion of the annulus.

6. A pneumatic tire comprising a plurality of strips of tire building material arranged substantially radially on one side of the tire to form substantially one half of a toroidal configuration, and a plurality of strips of tire building material arranged substantially radially on the other side of the tire to form substantially the other half of the toroidal configuration, said halves overlapping at the tread portion of the tire.

ALVIN J. MUSSELMAN.